Oct. 6, 1953
R. R. LAYTE
2,654,124
METHOD AND APPARATUS FOR MANUFACTURE
OF PLASTIC EDGE TYPE FILTERS
Filed July 20, 1951
2 Sheets-Sheet 2
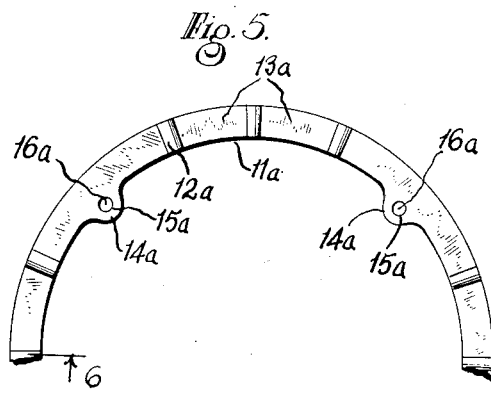
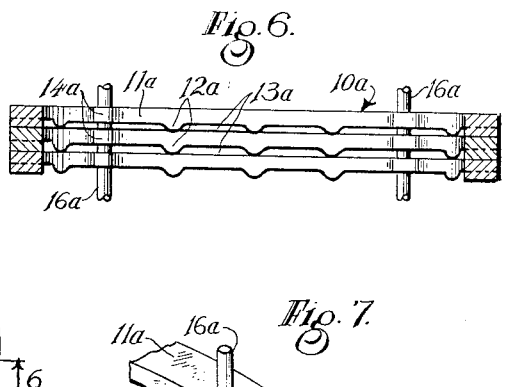
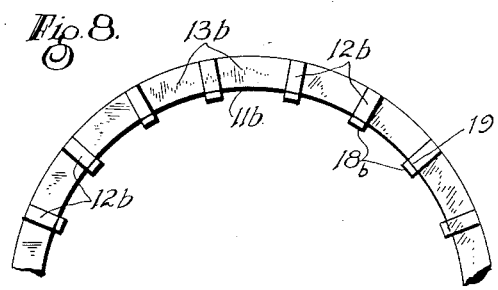
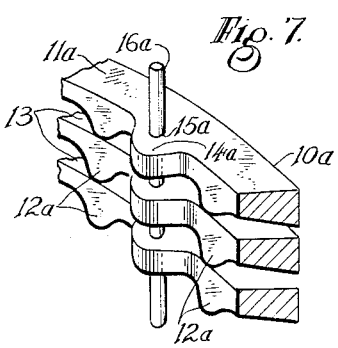
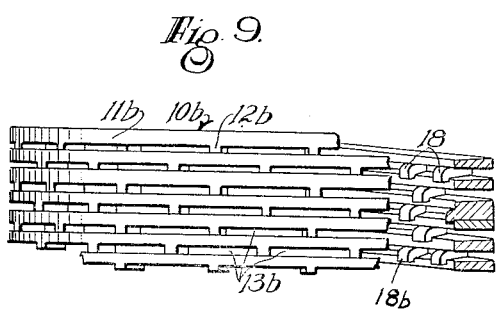
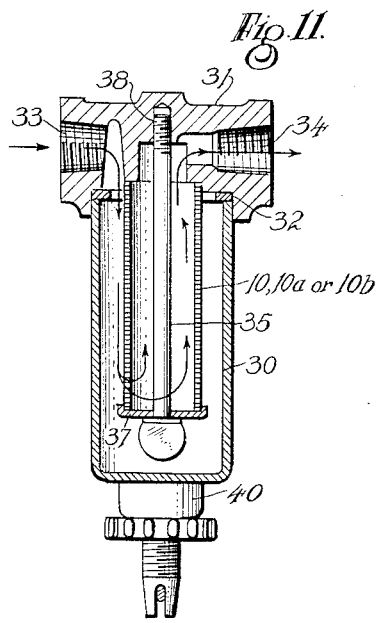
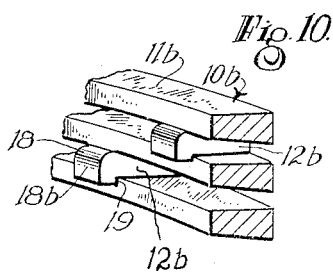
INVENTOR.
Ralph R. Layte
BY
Kenyon & Kenyon
ATTORNEYS Patented Oct. 6, 1953

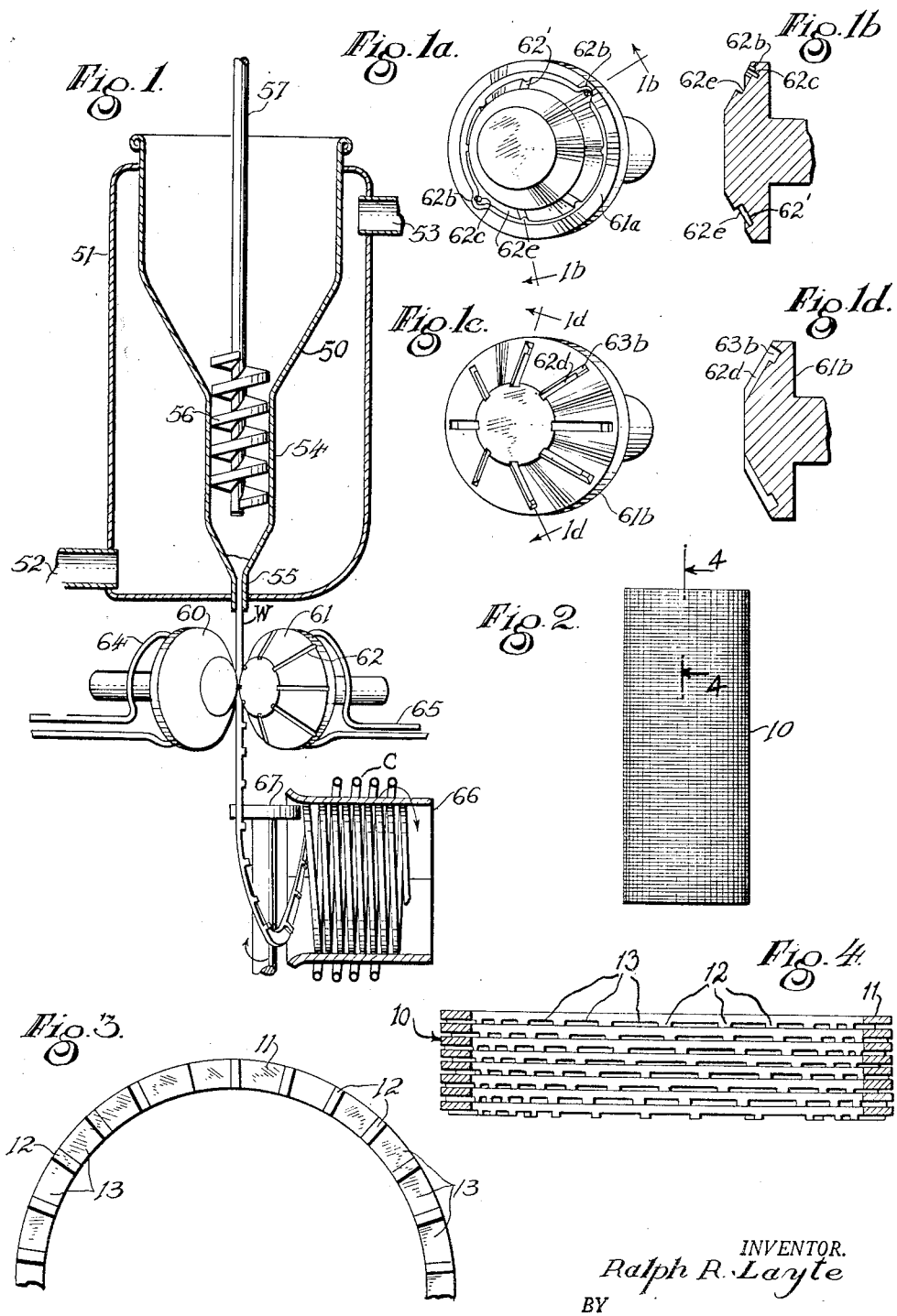

2,654,124

UNITED STATES PATENT OFFICE 2,654,124

METHOD AND APPARATUS FOR MANUFACTURE OF PLASTIC EDGE TYPE FILTERS

Ralph R. Layte, Westfield, N. J., assignor to Purolator Products, Inc., Rahway, N. J., a corporation of Delaware Application July 20, 1951, Serial No. 237,724

10 Claims. (Cl. 18—5)

1

This invention relates to plastic edge type filters and more particularly to method and apparatus for manufacture thereof, and is a continuation-in-part of my application Serial No. 17,084 filed March 25, 1948, now U. S. Patent No. 2,582,340.

Principal objects of this invention are to provide novel methods and apparatus for the manufacture of edge type filters of plastic material that are self supporting and do not require supporting frames.

Other objects and features of the invention are to provide novel methods and apparatus for producing such filters rapidly, efficiently and inexpensively.

A further object of the invention is the provision of methods and apparatus for making inexpensive plastic filter units of rigid construction that are capable of withstanding relatively high or low pressures and that have a large area of definitely sized filtering interstices within small compass and that require a minimum of plastic material in relationship to effective filtering surface and in which the need for a supporting frame is eliminated.

A filter unit made by the method and apparatus of this invention consists of a slotted plastic cylinder or tube composed of a helix of plastic ribbon of minute thickness having its wide faces normal to the axis of the helix, and means to space the turns of the helix to provide filtering slots, the spacing means preferably consisting of projections of predetermined height extending from one face of the ribbon. Preferably, the ribbon is preformed with definite uniform curvature, whereby without any deforming or straining, it naturally assumes helical shape with its wide faces transverse to the axis of the helix and with the turns of the helix spaced apart to a known distance by the said projections. The turns of the ribbon are definitely spaced to provide a succession of apertures or slots which are of uniform predetermined gauge or filtering width, corresponding substantially to the height of the projections and which may be so extremely narrow as to make the filter unit effective to remove from fluid passing through it all but the most minute particles. Due to the extreme thinness of the ribbon, the total area of the apertures or slots, i. e. the effective filtering area, forms a much larger proportion of the total area of the filter element than in previously known filters of rigid construction and therefore fluid to be filtered may be passed through the filter unit at a relatively high rate.

2

Although the plastic ribbon is uniformly curved or shaped in the method and apparatus of this invention so that it may easily be shaped or wound on edge in the form of a helix without any deforming or straining and will invariably tend to maintain its helical shape except for a tendency to bend due to its thin section, the tendency of the coils to slide sideways eccentrically from its major axis and their tendency to open up as would a too light spring upon the application of an elongating force must be eliminated. The method and apparatus also provide a way of eliminating such tendencies.

The manner of preforming the ribbon is a modification of that described, for example, in Liddell Patent 2,042,537 granted June 2, 1936, necessary changes however, in procedure and apparatus existing because of the use of plastic material rather than of metal for the ribbon.

Masses, quantities of or crystals of plastic material such as vinylidene chloride resins, polyvinyl butyral resins, nylon resins, vinyl chloride acetate resins are used. These materials, in addition to the various thermosetting resins, may be used in the case of oil filters. In the cases where corrosion or dissolving by the filtrate is not of importance, e. g., air, the selection of the material would be governed by the air temperature. In the case of corrosive liquids, such as acids or alkalis, the materials chosen would be those having good resistance to these substances. Hence, it may be stated that the choice of material to be used in the fabrication of the filter would be dependent upon the use for which it is intended and governed by the properties of these resinous materials. Masses, quantities of or crystals of materials just listed are placed in a hopper, heated to temperatures in prescribed ranges and by means preferably of a feed screw the heated plastic is extruded or forced under pressure and under heat through an extrusion nozzle of desired cross sectional shape to produce plastic wire or ribbon having the desired round, rectangular or trapezoidal cross section.

The plastic wire is then passed between rollers and shaped and formed substantially in the manner described in the said Liddell patent, forming a plastic edge type filter ribbon similar to the metallic filter ribbon of said Liddell patent. The rollers are heated, for example, by electric induction coils or by other ways to provide confined or directed heat in said rollers within prescribed temperature ranges to soften the thermoplastic materials and to polymerize the thermosetting resinous materials to a point just prior to final polymerization.

The ribbon is then in formed helices guided into a split ring type of sleeve for retaining the helices or turns in alignment and concentricity, and the adjacent coil edges are forced together by a roller or other appropriate means and by friction of the sleeve. The sleeve is appropriately heated as by electric induction or in other ways within prescribed temperature ranges. In the case of thermosetting materials, the temperature range is such that the ribs or risers of one coil of the helix are permanently joined to the back face of the adjoining coil at the contact points, by the polymerization stage prior to final polymerization, followed by the final polymerization to permanently harden the helix. In the case of thermoplastic materials, the temperature range is such that the coils are softened and the ribs are permanently bonded to the adjacent coils, with a cooling next occurring to harden the helix.

The shape of the plastic ribbon may be modified in formation to provide additional means for aligning the coils and maintaining their alignment in the finished product.

If desired, other ways of joining the coils can be provided. Likewise, if desired, the coils need not be joined so that they can be separated for cleaning purposes.

The filter structures provided by this method and apparatus invention are stronger, more economical to make and are resistant to the deleterious effects of acids, caustics, etc., dependent upon the resin or plastic used.

Other objects, novel features and advantages of the invention will be apparent from the following specification and accompanying drawing wherein:

Fig. 1 is a vertical, partially schematic diagram, partially in section of apparatus for producing edge type plastic filter elements embodying the invention;

Fig. 1a is a perspective view of a modified form of roller for shaping a modified form of ribbon;

Fig. 1b is a section taken along line 1b—1b of Fig. 1a;

Fig. 1c is a perspective view of another modified form of roller for shaping a further modified form of ribbon;

Fig. 1d is a section taken along line 1d—1d of Fig. 1c;

Fig. 2 is an elevational view of one form of filter element made by the method of this invention;

Fig. 3 is an enlarged bottom plan view of one of the helices or coil turns forming the filter of Fig. 2;

Fig. 4 is an enlarged partial section taken along line 4—4 of Fig. 2;

Fig. 5 is a view similar to that of Fig. 3 of a modified form of helix or coil turn;

Fig. 6 is an enlarged partial section similar to that of Fig. 4 of a filter element embodying the helices or coil turns of Fig. 5;

Fig. 7 is an enlarged fragmentary perspective view of a portion of a filter element embodying the helices or coil turns of Fig. 5;

Fig. 8 is a bottom plan view of a further modified form of helix or coil turn;

Fig. 9 is a fragmentary elevation partially in section of a filter element embodying the helices or coil turns of Fig. 8;

Fig. 10 is an enlarged fragmentary perspective view of a portion of a filter element embodying the helices or coil turns of Fig. 8; and Fig. 11 is a vertical section of one form of a filter unit in which filter elements made by the practice of this invention may be employed.

Referring now to the illustrated forms of filters made according to the invention and more specifically in Figs. 2–4 inclusive, the filter element comprises a slotted cylinder 10 formed from a substantially flat plastic ribbon 11 of minute thickness and which is provided on one face with spaced transverse ribs 12 all of which extend a similar distance outwardly from one of the faces of the ribbon, which distance is suited to the purposes for which the filter is to be used so that the resulting apertures, slits or slots 13 are definitely sized to permit the desired flow and to remove all particles of greater dimension than the height of the said ribs from the fluid being filtered. If desired, the ribbon 11 can have the tapering cross-section described in the aforesaid Liddell patent and the ribs 12 could have corresponding shape.

In the case of filters for lubricating oil of an internal combustion engine, the ribs 12 preferably should be upwards of one thousandth of an inch in height and not more than three thousandths, in order to remove the harmful abrasives and still allow the substantially clean oil to flow through the filter unit at such rate that the filter will be of practical utility. In other instances the range of heights of the ribs may lie between .0005 inch to .030 inch.

The dimensions of the ribbon are such as to provide a cylinder having strength to withstand the pressure and the service to which it is to be subjected.

The practical difficulties of preparing the filter unit 10 from ribbon 11 are avoided by forming a very thin ribbon but preshaping it with definite uniform curvature so that it naturally tends to assume helical shape with its faces in contact and transverse to the axis of the helix.

Furthermore, a cylindrical filter unit having the large ratio of effective filtering area to total area of filtering element which it is intended to make by the practice of this invention would be at least one hundred times larger in diameter than the thickness of the ribbon (in direction parallel to the axis of the cylinder). In such arrangement, the ribbon turns, if bonded at the ribs 12, have sufficient rigidity to hold the successive turns of the helix in alignment without the aid of auxiliary aligning or supporting means.

In an alternative form of element 10a as shown in Figs. 5 to 7 inclusive, the plastic ribbon 11a, is utilized for forming the filter element 10a. This ribbon 11a may be provided in addition to the ribs 12a with inwardly projecting lugs 14a arranged at appropriately spaced apart points of the internal edge of the ribbon 11a, or, if desired, arranged to project externally (not shown) of the outer edge of the ribbon 11a. Each of these lugs 14a is provided with a hole 15a. In this embodiment the tapered cross section of the ribbon is shown in Fig. 7. Such tapering is optional, however.

When ribbon 11a is formed into helices which are arranged in contact with each other with the ribs 12a abutting the unribbed adjacent surfaces of adjacent helices, lugs 14a and the bores 15a of various adjacent helices or turns are arranged to lie axially aligned so that rigid supporting rods 16a may be inserted and temporarily or permanently retained in the aligned bores 15a both during and subsequent to the permanent junction of the ribs 12a to adjacent surfaces of the adjacent helices. With such construction, the spacing 13a provided between adjacent helices is arranged to be substantially the same as that of spaces 13 between the helices of the first described modification of Figs. 3 to 4 inclusive.

In another embodiment shown in Figs. 8 to 10 inclusive, the filter element 10b consists of the plastic ribbon 11b. That ribbon 11b in addition to having the ribs 12b, is further modified by providing lateral inwardly or lateral outwardly extending lugs 18 that are shaped at their ends 18b to provide shoulders 19 as seen in Fig. 10. The tapered cross section of the ribbon is optional. With the construction of this figure, when the helices are pressed together to form the filter element 10b, the inner edges of adjacent helices or turns engage respective shoulders 19 of projections 18b provided on the preceding helices to prevent lateral displacement of the said helices. Such arrangement materially increases the strength of such filter elements 10b. The spacing 13b between adjacent helices is substantially the same as that 13 between the helices of the first modification of Figs. 2–4.

Plastic filer elements embodying the invention may be used in various types of filter structures. For example, in the structure shown in Fig. 11, the hollow casing 30 is provided with a casing head 31. A sealing gasket 32 provides an effective seal at the joint between the head 31 and the casing 30. An inlet passage 33 serves to admit oil or other fluid to be filtered to the casing 30 and outlet passage 34 permits the filtered liquid to flow out of the casing. A plastic filter element 10, 10a or 10b is secured in place in the axial direction of casing 30, for example, by an axially extending mounted bolt or member 35 which is headed at one end to engage a cap 37 and threaded at 38 to screw into the head 31. The cap 37 fits over one end of the filter unit 10, 10a or 10b and the other end of the latter abuts the head 31 about a portion of the outlet 34. The oil or other liquid to be filtered flows to casing 30 through inlet 33, downwardly in the casing, laterally through the interstices 13, 13a or 13b of the filtering element 10, 10a or 10b and upwardly to the outward flow passageway 34 as denoted by the arrows in Fig. 11. The flow direction may be reversed. Dirt is collected on the outer or inner surface of the supported filtered element 10 or 10a or 10b depending upon flow direction. The united head 31 and casing 30 bearing the filter element 10, or 10a or 10b are supported by a retaining yoke 40 which serves to hold the head and casing in joined condition. These parts may be readily separated for inspection and cleansing or replacement of the filtering unit.

The method and apparatus of forming the filtering elements are shown somewhat schematically in Figs. 1, 1a, 1b, 1c and 1d. As seen in Fig. 1 a container or hopper 50 is provided with a heating jacket 51 through which by way of inlet 52 and outlet 53 an appropriate heating medium may be circulated to provide temperatures in the range of 200° F. to 500° F. depending upon the plastic or resin used. If vinylidene chloride resin (Saran) is used the temperature range is 250° F. to 400° F. This heating medium may be steam or hot gaseous products of combustion or any other desirable medium. The hopper 50 is narrowed in a portion 54 and the portion 54 terminates in an extrusion nozzle 55.

The extrusion nozzle 55 has desired cross-sectional shape so that any material extruded therefrom will have the same desired cross sectional shape.

A feed screw 56 whose drive shaft 57 is appropriately driven operates in the narrow portion 54 of the hopper 50. This screw 56 acts to feed the contents of the hopper 50 to the extrusion nozzle 55 and to extrude such contents therefrom. Other extrusion means may be employed. The material inserted into the hopper 50 comprises masses, quantities or crystals of the plastic material hereinbefore described which soften and unify in the hopper under the heat provided by the medium in the jacket 51.

This softened material is fed by the feed screw 56 and extruded through the nozzle 55 as a continuous plastic wire W. This wire is fed directly from the nozzle 55 and passes between a pair of cooperating conical rollers 60 and 61. One of these rollers is provided with recesses 62 for forming the spacing projections or transverse ribs 12, if the ribbons 11a or 11b with their ribs 12 or 12b are desired rollers 61a or 61b later to be described are substituted for roller 61. These recesses 62 extend radially on the conical surface relative to the axis of rotation of roller 61 and successively come in contact with the wire being rolled between rollers 60 and 61 to form the ribs 12. The passage of the wire W between these rollers 60 and 61 or its substitutes 61a or 61b all of which are appropriately heated as by electric induction coils 64 and 65 or in other suitable ways to temperatures ranging from 200° F. to 250° F. for vinylidene chloride resin and 125° F. to 500° F. for other resins mentioned, acts not only to convert the extruded material into a thin flat ribbed ribbon, but, also, gives to it definite predetermined curvilinear shape which causes the formed ribbon to tend to assume the form of a helix as shown in Figs. 3, 5 or 8 with its wide faces in abutting relationship. Preferably the formed ribbon 11, 11a or 11b is guided to a split ring type of sleeve 66 which is rotated about its longitudinal axis. The ribbon is moved into the sleeve by the aid of a guiding roller 67 which is also rotated. The friction of the ribbon 11, 11a or 11b against the internal surfaces of the split ring 66 and the action of the guiding roller 67 tends to compress the helices or turns together to bring the ribs 12, 12a or 12b of each into abutment with the adjacent unribbed surface of the adjacent helices or turns.

The heat provided by the induction coils 64 and 65 to the rollers 60 and 61 or 61a or 61b is sufficient in the case of thermosetting resins to polymerize the plastic material of the ribbon to the point just prior to its final polymerization point or stage. In the case of thermoplastic resins the heat provided by the coils 64 and 65 keeps the ribbon pliable. Heat in either case also keeps the material of the ribbon pliable during its rolling and formation of the ribs thereon. The sleeve 66 is heated either by an induction coil C or in other appropriate ways sufficiently to a temperature ranging from 250° F. to 300° F. for vinylidene chloride resin, a thermo plastic material, to soften the coil turns sufficiently to result in bonding of ribs to adjacent turns and to a temperature of 125° F. to 500° F. for thermosetting resins or plastics mentioned hereinabove to provide polymerization heat for the thermosetting plastic material of the helices to soften the material enough to provide adhesion between abutting ribs and smooth helix surface portions and thereby to effect a permanent joint at the contact points of the ribs on one coil turn with the back or smooth faces of the adjacent coils, and then to polymerize said thermosetting material to its final stage. When a thermoplastic material is used, the coil is cooled in the sleeve 66 before removal therefrom. This allows the thermoplastic material of the coil turns to harden. If desired, the heating of the sleeve 66 can be made insufficient to effect permanent bonding and instead an appropriate adhesive can be applied to ribs 12, 12a or 12b prior to the delivery into the sleeve 66 of the helices or terms bearing such ribs. The heat of the sleeve in such event is kept below a temperature at which the ribs soften sufficiently to bond to adjacent turns in the case of thermoplastic material but sufficient to polymerize thermosetting material if used to final stage. In both cases the heat is sufficient to set the adhesive and thereby provide a permanent bond between the ribs and the back faces of the adjacent coil. The temperature range in such event of the sleeve is from 200° F. to 250° F. for vinylidene chloride resin and 125° F. to 500° F. for others of the resins mentioned. With thermoplastic material the helix is cooled in the sleeve before being removed to harden it.

In the event that it is desired to form filter elements of the forms described in Figs. 5 to 7 or 8 to 10 inclusive, the only replacement necessary is of the roller 61 either by a roller 61a or a roller 61b so that the extruded ribbon passing either between a modified roller 61a (Figs. 1a and 1b) or a modified roller 61b (Figs. 1c and 1d) and a roller corresponding to a roller 60 will impart or provide the appropriate projections 14a or 18, 18b and 19 in addition to the respective ribs 12a or 12b. For example, to provide ribbon 11a of the form shown in Figs. 5–7, the roller 61a has an annular recess 62e with the depressions 62' for forming ribs 12a. In addition the annular recess 62e is provided with lateral recesses or offset portions 62b each having an island 62c shaped to correspond respectively with the lateral extensions 14a and the position of holes 15a therein so that passage of the extruded wire W between a roller 60 and a roller 61a will form the lateral projections 14a with holes 15a in addition to the ribs 12a on ribbon 11a.

Similarly, if the ribbon 11b of the third modification is desired, a roller 61b (Figs. 1c and 1d) instead of roller 61 is provided with recesses 62d to form the ribs 12b and in addition these recesses 62d have additional depressions 63b necessary for the direct formation of the portions 18, 18b and the shoulders 19 of the ribs 12b. Substitution either of roller 61a or roller 61b as the case may be for the roller 61 is all that is required to produce the respective ribbons 11a or 11b, instead of ribbon 11.

By the term "helix" as used in the foregoing description and in the appended claims, it is intended to include elements which are substantially cylindrical in form, such for example, as truncated cones and similar shapes.

The filter structures above made as above described combine the qualities of uniformly fine edge filtration, great structural strength and a high degree of filtering efficiency, that is, a high ratio of effective filtering area to the total area of the filtering unit. The strength and uniformity of filtering qualities of tube filters are herein combined with the high filtering efficiency of a wire screen. The edgewise arrangement of the ribbon on the support combined with the lateral support given to each turn by the adjacent turn through the spaced ribs results in a very strong and rigid construction capable of withstanding pressures entirely outside the range of possibility of wire screens of corresponding filtering fineness and yet having a filtering efficiency comparable with that of wire screens. The efficiency of edge filters is combined with structural strength sufficient to withstand high pressures in an inexpensive and light device which is economical to manufacture and of extreme durability.

While specific embodiments of the invention have been described, it will be understood that variations in details and in forms of construction and of details of method within the scope of the claims are contemplated. There is no intention, therefore, of limitation to the exact details shown and described.

What is claimed is:

1. In a method for forming a filter unit comprising a continuous element of plastic material in the form of a helix which has filtering interstices between adjacent turns of the helix, the steps comprising providing plastic material, heating and shaping the plastic material into form of a wire, rolling this wire under heat into a transversely ribbed ribbon of substantially greater width than thickness, and directly thereafter shaping the ribbed ribbon into the form of a helix comprising a multiplicity of contacting turns with the width of the ribbon lying substantially normal to the axis of the helix and with the wider faces of the ribbon in opposed relation and heating the helix to bond the turns thereof together.

2. In a method for forming a filter unit comprising a continuous element of thermosetting plastic material in the form of a helix which has filtering interstices between adjacent turns of the helix, the steps comprising heating the plastic material to soften the latter and shaping the heated material into form of a wire, rolling this wire while maintaining it at a temperature below the final polymerization stage temperature of the material into a transversely ribbed ribbon of substantially greater width than thickness, directly thereafter shaping the ribbed ribbon into the form of a helix comprising a multiplicity of turns with the width of the ribbon lying substantially normal to the axis of the helix and with the wider faces of the ribbon in opposed relation and in contact with the ribs on the adjacent turns and heating the so arranged turns to the temperature of the final polymerization stage of the thermosetting material.

3. In a method for forming a filter unit comprising a continuous element of plastic material in the form of a helix which has filtering interstices between adjacent turns of the helix, the steps comprising providing plastic material, heating said plastic material, extruding the plastic material in the form of a wire, rolling this wire into a transversely ribbed ribbon of which the width is substantially larger than the thickness thereof, and forming the ribbed ribbon into the form of a helix comprising a multiplicity of turns with the width of the ribbon lying substantially normal to the axis of the helix and with the wider faces of the ribbon in opposed relation and in contact with the ribs on the adjacent turns and joining the ribs of the ribbon to the wide faces with which they are in contact by heating to provide a self-supporting filter unit.

4. In a method for forming a filter unit comprising a continuous element of thermosetting synthetic plastic material in the form of a helix which has filtering interstices between adjacent turns of the helix, the steps comprising heating synthetic thermosetting material, extruding the heated material in the form of a wire, rolling the wire while heated to a temperature sufficient to soften the thermosetting material and to polymerize it to a point prior to final polymerization stage to form a transversely ribbed ribbon whose width is substantially greater than its thickness, forming and arranging the ribbed ribbon into a helix comprising a multiplicity of turns with the width of the ribbon lying substantially normal to the axis of the helix and with the wider faces of the ribbon in opposed relation and in contact with the ribs on the adjacent turns, and heating the turns of the so arranged helix to final polymerization state of the plastic material thereof while maintaining such arrangement of said turns.

5. In a method for forming a filter unit comprising a continuous element of synthetic plastic material in the form of a helix which has filtering interstices between adjacent turns of the helix, the steps comprising heating quantities of thermoplastic synthetic material, extruding the heated material in the form of a wire, rolling the wire while heated to a temperature sufficient to soften the thermoplastic material to form a transversely ribbed ribbon whose width is substantially greater than its thickness, forming and arranging the ribbed ribbon into a helix comprising a multiplicity of turns with the width of the ribbon lying substantially normal to the axis of the helix and with the wider faces of the ribbon in opposed relation and in contact with the ribs on the adjacent turns, permanently bonding the contacting surfaces of ribs and wide faces of the ribbon together, and cooling the turns of the so arranged helix to harden the plastic material thereof while maintaining such arrangement of said turns.

6. In a method for forming a filter unit comprising a continuous element of synthetic plastic material in the form of a helix which has filtering interstices between adjacent turns of the helix, and steps comprising heating quantities of thermoplastic synthetic material, extruding the heated material in the form of a wire, rolling the wire while heated to a temperature sufficient to soften the thermoplastic material to form a transversely ribbed ribbon whose width is substantially greater than its thickness, forming and arranging the ribbed ribbon into a helix comprising a multiplicity of turns with the width of the ribbon lying substantially normal to the axis of the helix and with the wider faces of the ribbon in opposed relation and in contact with the ribs on the adjacent turns, heating the turns of the so arranged helix to effect a bonding of the contacting surfaces of ribs and wide faces while maintaining such arrangement of said turns, and cooling the turns of the so arranged helix to harden the helix in its arrangement of turns.

7. Apparatus for making a plastic filter unit of the character described comprising a container for plastic material, heating means for said container, an extruding nozzle for said container, extruding means for forcing plastic material from said nozzle in the form of a wire, a pair of rollers adjacent said nozzle positioned to receive the wire upon its extrusion and to roll it therebetween, one of said rollers having recesses in its surface extending radially of its axis of rotation to contact said wire when the latter is rolled between said rollers, heating means for said rollers, the rolling of said wire transforming it into a thin flat ribbon having transversely extending ribs on a wide face of the ribbon, a sleeve, means for receiving the ribbon delivered from between the said pair of rollers and for guiding the ribbon into said sleeve to form a helix therein having a multiplicity of turns, and means for heating said sleeve.

8. A device as per claim 7 in which one of the recesses has a laterally offset portion with an island to provide laterally extending perforated lugs in the ribbon at spaced apart points.

9. A device as per claim 7 in which each recess has a deepened portion to provide lugs on the ribs during rolling.

10. A device as per claim 7 in which both rollers have conical faces and one of said rollers has recesses on its conical face.

RALPH R. LAYTE.

References Cited in the file of this patent

UNITED STATES PATENTS

| Number | Name | Date |
|---|---|---|
| 2,042,537 | Liddell | June 2, 1936 |
| 2,411,660 | Manning | Nov. 26, 1946 |